US011738379B2

(12) United States Patent
Gregg (10) Patent No.: US 11,738,379 B2
(45) Date of Patent: Aug. 29, 2023

(54) INJECTION REMEDIATION SYSTEMS AND METHODS

(71) Applicant: Gregg Drilling, LLC, Signal Hill, CA (US)

(72) Inventor: John Gregg, Signal Hill, CA (US)

(73) Assignee: Gregg Drilling, LLC, Signal Hill, CA (US)

( * ) Notice: Subject to any disclaimer, the term of this patent is extended or adjusted under 35 U.S.C. 154(b) by 0 days.

(21) Appl. No.: 17/381,948

(22) Filed: Jul. 21, 2021

(65) Prior Publication Data

US 2022/0023926 A1 Jan. 27, 2022

Related U.S. Application Data

(60) Provisional application No. 63/054,399, filed on Jul. 21, 2020.

(51) Int. Cl.
| | |
|---|---|
| *B09C 1/08* | (2006.01) |
| *G05D 7/06* | (2006.01) |
| *B60P 3/22* | (2006.01) |
| *G05D 11/13* | (2006.01) |
| *G01F 23/20* | (2006.01) |

(52) U.S. Cl.
CPC ............... *B09C 1/08* (2013.01); *B60P 3/228* (2013.01); *G05D 7/0682* (2013.01); *G05D 11/134* (2013.01); *B09C 2101/00* (2013.01); *G01F 23/20* (2013.01)

(58) Field of Classification Search
CPC .... B09C 1/08; B09C 2101/00; G05D 7/0682; G05D 11/134; B60P 3/228
See application file for complete search history.

(56) References Cited

U.S. PATENT DOCUMENTS

| | | | |
|---|---|---|---|
| 10,406,961 B2 * | 9/2019 | Grodecki | ............. A01C 15/003 |
| 2017/0021318 A1 * | 1/2017 | McIver | ................. B65D 88/32 |

FOREIGN PATENT DOCUMENTS

WO    WO-2013116409 A1 *    8/2013    ............. A01C 17/00

\* cited by examiner

*Primary Examiner* — Janine M Kreck (57) ABSTRACT

This invention relates generally to injection remediation systems and methods. In one embodiment, an injection remediation system includes, but is not limited to, at least one reservoir configured to contain material; at least one load sensor supporting the at least one reservoir; at least one dosing pump operably coupled to the at least one reservoir and configured to controllably source the material; and at least one processor configured to determine an amount of the material sourced from the at least one reservoir based at least partly on weight information obtained from the at least one load sensor.

19 Claims, 5 Drawing Sheets

Figure 5

INJECTION REMEDIATION SYSTEMS AND METHODS

PRIORITY CLAIM

This application is a non-provisional patent application of U.S. provisional patent application 63/054,399 filed Jul. 21, 2020, titled Mass Balance System and Method of Monitoring the Mixing Apparatus for Injection of Various Agents (bacterial and chemical) for Portable Remediation Systems (DOCKET GD-P-01).

This application claims the benefit of and/or priority to each of the foregoing patent applications and any and all parent, grandparent, and great-grandparent applications thereof. The foregoing patent applications are incorporated by reference in their entirety as if fully set forth herein.

FIELD OF THE INVENTION

This disclosure relates generally to injection remediation systems and methods.

BACKGROUND

Injection remediation systems measure flow rate for purposes including at least measuring injection material velocity, determining whether injection material is being accepted at a delivery site, and evaluating soil or subsurface conditions. Flow rate measurements, however, do not provide information on injection material content or constituent ratios; and, flow sensors are prone to corrosion and damage due to chemicals and/or the high solid content of the injection material. Additionally, injection material is often be mixed from constituent ingredients onsite using mass and volume recipes that are difficult to accomplish with existing injection remediation systems. Therefore, embodiments of the present disclosure overcome these and other deficiencies to substantially improve the state of the art.

SUMMARY

Embodiments disclosed herein relate generally to injection remediation systems and methods. In one embodiment, an injection remediation system includes, but is not limited to, at least one reservoir configured to contain material; at least one load sensor supporting the at least one reservoir; at least one dosing pump operably coupled to the at least one reservoir and configured to controllably source the material; and at least one processor configured to determine an amount of the material sourced from the at least one reservoir based at least partly on weight information obtained from the at least one load sensor.

In another embodiment, a vehicle injection remediation system includes, but is not limited to, a first reservoir configured to contain first material, the first reservoir including a first load sensor and a first dosing pump for sourcing the first material; a second reservoir configured to contain second material, the second reservoir including a second load sensor and a second dosing pump for sourcing the second material; at least one injection head; one or more plumbing lines connecting the first reservoir and the second reservoir to the at least one injection head; at least one processor configured to control the first dosing pump and/or the second dosing pump to maintain a specified ratio between the first material and the second material based at least partly on weight information obtained from the first load sensor and the second load sensor.

In a further embodiment, an adaptor for an injection remediation system includes, but is not limited to, a frame configured to support a reservoir of the injection remediation system; a plurality of load sensors positioned on the frame and configured to measure weight applied to the frame; and at least one processor configured to determine an amount of the material sourced from the reservoir based at least partly on weight information obtained from the at least one load sensor; and at least one interface configured to communicate information associated with the amount of the material for controlling one or more dosing pumps.

BRIEF DESCRIPTION OF THE DRAWINGS

Embodiments are described in detail below with reference to the following drawings.

DETAILED DESCRIPTION

This disclosure relates generally to injection remediation systems and methods. Certain embodiments are set forth in the following description and in FIGS. 1-5 to provide a thorough understanding of such embodiments.

Figure 1:
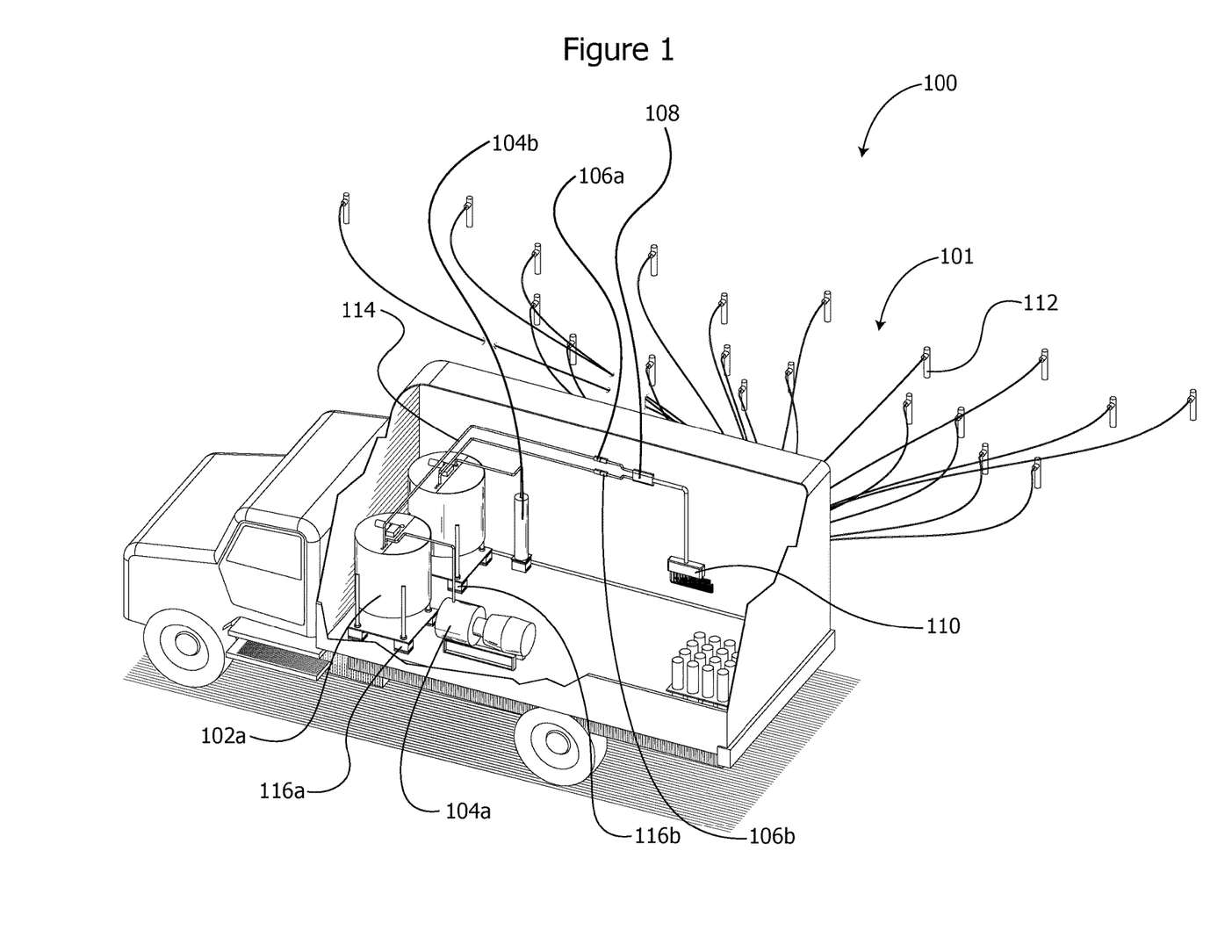
FIG. 1 is an environmental view of an injection remediation system, in accordance with an embodiment.

FIG. 1 is an environmental view of an injection remediation system, in accordance with an embodiment. An injection remediation system 100 includes, but is not limited to, at least one reservoir 102b configured to contain material; at least one load sensor 116b supporting the at least one reservoir 102b; at least one dosing pump 106b operably coupled to the at least one reservoir 102b and configured to controllably source the material; and at least one processor configured to determine an amount of the material sourced from the at least one reservoir 102b based at least partly on weight information obtained from the at least one load sensor 116b. In one particular embodiment, one or more plumbing lines 114 connect the at least one reservoir 102b to at least one injection head 112. In a further embodiment, at least one injection pump 108 is associated with the one or more plumbing lines 114 and is configured to pressurize the material. In a further embodiment, at least one manifold 110 includes one or more auxiliary ports configured to distribute the material. In yet another embodiment, the system 100 further includes at least one additional reservoir 102a configured to contain the same or different material; at least one additional load sensor 116a supporting the at least on additional reservoir 102a; and at least one additional dosing pump 106a operably coupled to the at least one additional reservoir 102a and configured to controllably source the different material, wherein the at least one processor is configured to determine an amount of the material sourced from the at least one reservoir 102b and an amount of the different material sourced from the at least one additional reservoir 102a based at least partly on weight information obtained from the at least one load sensor 116b and the at least one additional load sensor 116a. In certain embodiments, the system 100 is incorporated with vehicle 118.

In certain embodiments, injection system 100 provides or conducts in situ remediation of contaminant plumes in soil and/or ground water. Using portable drilling and direct push machines, hollow rods are driven or pushed into the soil. At various depths, the soil is fractured using compressed gas or pressurized fluid to initiate fluid or material flow into the target soil horizon. Depending on the contaminant of concern, various oxygenators, chemical reagents or bacteria are introduced into these fractures to facilitate bio remediation. The various injection fluids or materials are mixed using a portable injection platform. The platform, which can be truck, trailer, or vessel mounted, contains various raw material tanks, mix tanks, injection pumps, and/or control hardware and/or software. The system 100 relies on mass measurements, using load cells disposed beneath the subject raw material and mix tanks, in addition to or as a supplement to flow volume and/or pressure, to simplify and/or improve the injection fluid or material mixing and/or injection process.

In one embodiment, the vehicle 118 includes any car, truck, van, trailer, rig, or any other manned or unnamed machine. The vehicle 118 as depicted includes a truck and trailer combination with an enclosed area for housing the injection remediation components. Within the trailer, the vehicle 118 includes a mixing tank 102a, mixing tank 102b, raw material tank 104a, and/or raw material tank 104b configured to source and/or mix injection materials or fluid. The dosing pump 106a and/or dosing pump 106b controllably source the injection materials using plumbing lines 114 connected to the mixing tank 102a, mixing tank 102b, raw material tank 104a, and/or raw material tank 104b. The sourced injection material is fed via the plumbing lines to an injection pump 108 that pressurizes and the injection material. The manifold 110 includes a plurality of output ports and distributes the injection material to a plurality of injection heads 112 disposed in an injection remediation area 101. Load sensor 116a and/or load sensor 116b are disposed under the mixing tank 102a and/or mixing tank 102b and are configured to provide weight output, respectively. A computer processor configured with software operates to determine weight over time of the mixing tank 102a and/or mixing tank 102b and use the weight information to perform useful operations, including any one of the following: determine injection material mixture ratio, determine injection material flow rate, determine volume of injection material used, determine mass of injection material used, determine a variance extant between mass used vs. flow meter output, control or adjust a dosing pump operation, adjust a constituent ingredient amount of the injection material, modify mixing duration or rate of the injection material, or other operation.

In certain embodiments, any components of the system 100 can be omitted, augmented, or differently arranged. For instance, either of the mixing tank 102a and the mixing tank 102b can be omitted or augmented to provide no mixing tanks, a single mixing tank, or a plurality of mixing tanks. Likewise, any of the raw material tank 104a and raw material tank 104b can be omitted or augmented to provide no raw material tanks, a single raw material tank, or a plurality of raw material tanks. Any mixing tanks, such as mixing tank 102a, can include zero, one, or a plurality of connected raw material tanks, such as raw material tank 104b, that are configured to source raw material ingredients. Similarly, any of the dosing pump 106a and dosing pump 106b can be omitted or augmented to provide zero, one, or a plurality of dosing pumps. Additionally, dosing pumps can be provided to source raw material from any of the raw material tanks, such as raw material tank 104b, for any mixing tank, such as mixing tank 102a. Thus, a dosing pump, such as dosing pump 106b, can be positioned to source raw materials from a raw material tank and/or a mixing tank. Additionally, a dosing pump, such as dosing pump 106a, can be positioned to transfer mixed material from one mixing tank to another mixing tank, such as from mixing tank 102a to mixing tank 102b. In other embodiments, the injection pump 108 can be augmented or differently positioned. For instance, a plurality of independent injection pumps can be provided for each mixing tank, such as mixing tank 102a, and/or each raw material tank, such as raw material tank 104. The injection pumps can also be combined in parallel and/or in series, and can be disposed downstream of any manifold, such as manifold 110. In further embodiments, the plumbing lines 114 are different configured. For example, plumbing lines 114 can connect each of the mixing tank 102a and mixing tank 102b independently to the injection pump 108 for combination prior to the manifold 110 as illustrated. Alternatively, plumbing lines 114 can connect each of the mixing tank 102a and mixing tank 102b to independent injection pumps and/or manifolds to join downstream, such as at or proximate to the injection head 112. Likewise, plumbing lines 114 can connect a raw material tank, such as raw material tank 104a, directly to an injection pump 108 or downstream of a manifold, such as manifold 110, thereby bypassing a mixing tank, such as mixing tank 102a. The components of system 100 and their arrangement are exemplary, but many modifications can be made to accomplish a particular injection remediation mission.

In some embodiments, the raw material tank 104a and/or raw material tank 104b are containers or reservoirs that are configured to store and/or source ingredients for injection remediation. The raw material tank 104a and/or raw material tank 104b are approximately 5 to approximately 300 gallons, but other sizes are possible. The raw material tank 104a and/or raw material tank 104b are composed of steel, aluminum, carbon fiber, plastic, or other metal, synthetic, or composite material. The injection materials stored can include a variety of liquids, solids, or mixtures, including any of water, oil, polymers, iron filings, vegetable oil, persulfate, hydroxide, or the like. Using one or more plumbing lines 114, gravity, a feeder, a duct, or other dispenser, the raw material tank 104a and/or raw material tank 104b can source ingredients to one or more of the mixing tank 102a and/or mixing tank 102b. Alternatively, the raw material tanks 104a and/or raw material tank 104b can source material directly to an injection pump 108 without first entering a mixing tank, such as mixing tank 102a or mixing tank 102b. Additionally, either of the raw material tanks 104a and/or raw material tank 104b can source material jointly to one or more mixing tanks, such as mixing tank 102a. One or more dosing pumps can control an ordered sequence of sourcing from one or more of the raw material tanks 104a and/or raw material tank 104b.

In additional embodiments, the mixing tank 102a and/or the mixing tank 102b are configured to mix injection materials. The mixing tank 102a and/or the mixing tank 102b can be approximately 5 to 300 gallons, but other sizes are possible. The mixing tank 102a and/or the mixing tank 102b can be composed of steel, aluminum, carbon fiber, plastic, or other metal, synthetic, or composite material. Either of the mixing tank 102a and/or the mixing tank 102b include one or more dry material feeders, one or more dry material eductor, one or more liquid dosing manifolds, one or more bulk dry feed systems, and/or connections to one or more raw material tanks or reservoirs, such as raw material tank 104b. The mixing tank 102a and/or the mixing tank 102b can be equipped with a slight conical base, such as with an approximately 1" to approximately 3" slope terminating at a drain plug. Internal to the mixing tank 102a and/or mixing tank 102b includes one or more splash fins and/or a mixer. A mixer motor and/or gear box can be coupled to the mixer of the mixing tank 102a and/or the mixing tank 102b, such as a 0.5 to 5 hp electric or gas motor at approximately 1000 RPM to approximately 5000 RPM. A lid of the mixing tank 102a and/or mixing tank 102b includes a hinge with a friction or other locking mechanism that exposes one or more couplers, such as 1" or 2" full couplers. The mixing tank 102a and/or the mixing tank 102b can independently mix the same or different injection materials simultaneously or in series. For instance, to maintain continuity and minimize disruption of injection remediation, the mixing tank 102a can be dispensing an injection material formerly mixed, while the mixing tank 102b is preparing an additional batch of the same injection material for subsequent dispensation. For instance, mixing tank 102b can condition water, then mix in solids, oil, polymer, and/or suspended iron filings. Alternatively, mixing tank 102b can mix vegetable oil at approximately 60% by mass with activated persulfate at approximately 20% by mass with water, and approximately 5-15% of hydroxide by volume, for example. Alternatively, to isolate injection materials that could chemically react when mixed, the mixing tank 102a can be dispensing a first injection material while the mixing tank 102b can simultaneously be dispensing a second injection material that is different from the first injection material, whereby the first and second injection materials are jointly or independently injected via one or more injection heads 112 using dual manifolds 110, for example.

In one embodiment, one or more load sensors, such as load sensor 116a, are disposed below or otherwise support any one or more of a mixing tank, reservoir, or raw material tank. The one or more load sensors are configured to convert downward force exerted by mass or weight into one or more electrical signals. The resultant output of the one or more load sensors is used to determine a weight. The output can be an analog output or a digital data output and can be read using I2C, SPI, UART, an analog to digital converter, or otherwise using one or more processors. The weight determined using the one or more load sensors can be tared to provide precision information at a point in time for injection material, with weight optionally being determined over time to yield trend or rate information for the injection material. For example, the one or more load sensors can include a commercially available load cell such as the "Arlyn Upscale Digital Indicator" to digitize, store, output, and/or manage data as necessary.

In certain embodiments, at least one load sensor 116a and at least one load sensor 116b is provided for the mixing tank 102a and the mixing tank 102b, respectively. The at least one load sensor 116a is used to determine the weight of the mixing tank 102a and the at least one load sensor 116b is used to determine the weight of the mixing tank 102b. The at least one load sensor 116a can comprise a plurality of load sensors, such as four load sensors with each load sensor being positioned under a support member of the mixing tank 102a. Likewise, the at least one load sensor 116b can comprise a plurality of load sensors, such as three load sensors positioned under a base or platform supporting the mixing tank 102b. In certain embodiments, one or more load sensors can optionally be disposed below one or more of the raw material tank 104a and/or the raw material tank 104b, such as two load sensors under the raw material tank 104a and/or five load sensors under the raw material tank 104b.

In some embodiments, the at least one load sensor 116a and/or the at least one load sensor 116b are electronically coupled to one or more processors configured to implement one or more program instructions. The one or more processors are configured to determine a weight or mass of a particular mixing tank, reservoir, or raw material tank at one or more moments in time. The one or more processors is configured to determine weights of individual raw material tanks, mixing tanks, or reservoirs constantly, continuously, or intermittently, either simultaneously or at staggered intervals. In a case where a plurality of load sensors are disposed underneath a given tank, reservoir, or raw material tank, the one or more processors are configured to totalize the individual weights sampled for each of the plurality of load sensors to determine a combined weight for the injection material. For example, the one or more processors can determine a combined weight of 825 lbs. in an event that mixing tank 102a includes the following four weights determined from four individual load sensors 175 lbs., 200 lbs., 225 lbs., and 225 lbs.

In one particular embodiment, the mass from at least two points in time of any given mixing tank, reservoir, or raw material tank is used to determine flow rate or volume over time, with or without a flow rate sensor that directly measures flow rate. A delta between a mass at time 1 and a mass at time 2 is determined as a total consumed mass. The total consumed mass for the time lapse between time 1 and time 2 is then converted to volume using the relationship of volume being mass divided by density. Density is can be unavailable for a particular injection material or difficult to ascertain when the injection material is a mixture or has undergone a chemical reaction. Accordingly, the disclosure herein provides an improvement in the art by enabling real-time density determinations for a given injection material. The particular mixing tank, raw material tank, or reservoir holding the injection material is fitted with one or more level sensors or level lines that are usable by the computer processor to determine density. With a known volume of the particular mixing tank, raw material tank, or reservoir for a given fill level of the injection material, and with a known mass as determined by one or more load sensors, the density for the injection material can be determined automatically and in near-real-time using the relationship of density being mass divided by volume. Thus, the one or more processor can determine density for the material and then use mass calculations over known time periods to determine the volume consumed. The volume consumed is divided by the time delta, such as between time 1 and time 2, to determine a volume amount per unit of time, which is flow rate for the injection material. For instance, the mixing tank 102 can be filled with water to a top level line associated with 125 gallons. The one or more load sensors 116a enable the one or more processors in determining a mass and thereafter a density of the water using the fill line sensor output indicating 125 gallons. The mass determined of 1037.5 lbs. is used to determine the density of 8.3 lbs./gallon. Thereafter, the one or more processors uses output from the one or more load sensors 116a at the starting time and sample time of 5 minutes thereafter to determine mass of 1037.5 lbs. and 996 lbs., respectively. The one or more processors then determines the volume consumed as 5 gallons and the time delta as 5 minutes, yielding a flow rate of 1 gallon per minute for the water dispensed from the mixing tank 102a. Water has well documented properties, but other injection materials and/or mixtures may not, so the above arrangement of one or more load sensors, level sensors, and/or processors, can operate to provide the necessary flow rate information for any material in real-time or near-real-time, or with lagging averaging. Furthermore, in cases where fill levels are visually identifiable, the one or more processors can accept the fill level as a user input without use of one or more level sensors. And, in cases where material densities are known, the density information can be accepted by the one or more processors as a user or data input without use of one or more level sensors.

In further embodiments, the one or more processors uses the mass information to determine a mixture ratio of two or more injection materials sourced from one or more mixing tanks, raw material tanks, and/or reservoirs. For a mixture ratio expressed as a percentage of mass, the one or more processors determines a first delta in mass over time for a first injection material and then a second delta in mass over time for a second injection material. The one or more processors then uses the first delta in mass and the second delta in mass to determine a mass ratio for the first injection material and the second injection material over time. For example, the one or more processors determines the mass of a first material over time sourced from the mixing tank 102a using the one or more load sensors 116a. Likewise, the one or more processors determines the mass of a second material over the time sourced from the mixing tank 102b using the one or more load sensors 116a. The one or more processors calculates the mass of the first material over the mass of the second material as the mass ratio of the injection materials over time. The one or more processors can factor in a plurality of additional mass changes over time for more complex mass ratio determinations involving more than two injection materials. Additionally, the one or more processor can alternatively or optionally provide injection ratios as a factor of volume using the relationship of volume being mass divided by time. The one or more processors operates in conjunction with one or more mass sensors and one or more level sensors to obtain density information for each of two or more injection materials. Subsequently, the one or more processors uses mass changes over time for two or more injection materials obtained using the one or more mass sensors, and uses the respective density information for each of the two or more injection materials, to determine the volume ratio for the injection materials over the time. For example, the one or more processors uses a built-in level sensor for mixing tank 102a and load sensor 116a to determine the density of a first injection material. The one or more processors uses a built-in level sensor for mixing tank 102b and load sensor 116b to determine the density of the second injection material. The one or more processors then monitors or samples the mass changes over time from the load sensor 116a and the load sensor 116b to determine mass consumed for each of the first injection material and the second injection material, respectively. Thereafter, the one or more processors uses the mass and density for each of the first injection material and the second injection material to determine volumes consumed for each of the first injection material and the second injection material. The one or more processors determines the ratio by volume of the first injection material to the second injection material. As with mass ratios, the one or more processors can express more complex volumetric ratios with three or more constituent injection materials as desired.

In further embodiments, the system includes one or more dosing pumps, such as dosing pump 106a and dosing pump 106b. Each of the mixing tanks 102a and mixing tank 102b include a dosing pump, but also any of the raw material tanks 104a and 104b may be associated with a respective dosing pump. Certain ones of the reservoirs, raw material tanks, or mixing tanks can include zero, one, or a plurality of dosing pumps. Additionally, any of the dosing pumps can operate to transfer material to or between one or more reservoirs, raw material tanks, or mixing tanks. The dosing pumps can further be used to source injection material from any of the reservoirs, raw material tanks, or mixing tanks and deliver the same to a mixture line, an injection pump, a manifold, an injection head, and/or other plumbing. The dosing pumps can include electric or hydraulic modes of operation and can be configured with speed or rate adjustments by the one or more processors based on any of the following parameters: mass, volume, time, and/or speed. For example, the one or more processors can accept user input defining a mass amount of an injection material contained in mixing tank 102a to pump over time. The one or more processors can determine a speed or rate setting for the dosing pump 106a based thereon such that the dosing pump 106a operates to pump or source the mass amount defined for the particular material obtained from the mixing tank 102a. The one or more processors can obtain mass change amounts of the injection material in the mixing tank 102a using data on mass retrieved using the load sensor 116a over time. Feedback to the dosing pump 106a is provided by the one or more processors such that the rate of the dosing pump 106 throughput is adjusted either up or down to correct for variance in the desired mass of the injection material sourced over time. The one or more processors can similarly operate a plurality of dosing pumps in coordination, such as dosing pump 106a and dosing pump 106b to control the rate of injection material throughput based on discrete or ratio values associated with any of the factors of: time, speed, volume, and/or mass. Thus, the system 100 provides operator efficiency gains by realizing precise mass, volume, speed, or temporal sourcing of independent injection materials or mixtures/ratios of injection materials, with processor and sensor based feedback and/or continuous titration of pumps to meet specific recipe specifications.

In further embodiments, the system 100 includes an injection pump 108, which can include a D35 hydraulic injection pump, a 3L8 hydraulic injection pump, a centrifugal-type electric injection pump, or any other pressurizing pump. The injection pump 108 operates to pressurize the injection material or injection material mixture and force the injection material through the one or more injection heads. A plurality of injection pumps 108 may be used, such as with a plurality of or dual manifolds 110 that operate to independently deliver respective injection materials or injection material mixtures at the injection remediation site 101. The dual or plurality of manifold 110 options are usable in contexts where chemical reactions may take place between injection materials and/or where injection material isolation is desired until a particular point in the system 100 or at the site 101. Alternatively, a series of injection pumps 108 can operate over lengths of plumbing to repressurize injection material due to pressure loss along a length of plumbing 114 or to further boost pressure of injection material. In certain embodiments, the injection heads 112 comprise a plurality of injection heads extending from a multi-ported manifold 110. For instance, the manifold 110 can include approximately 2 to 30 auxiliary ports each extending via flexible lines such as wire braided high-pressure-rated flexible tubing to respective injection heads 112 as rod strings. Each rod string is composed of a hollow rod with one or more orifices that enables pressurized release of injection material. The injection heads 112 are positioned approximately 2 to 30 feet apart to collectively impact a soil mass at the injection remediation site 101. Other configurations of injection heads 112 are within the scope of the present disclosure.

Figure 2:
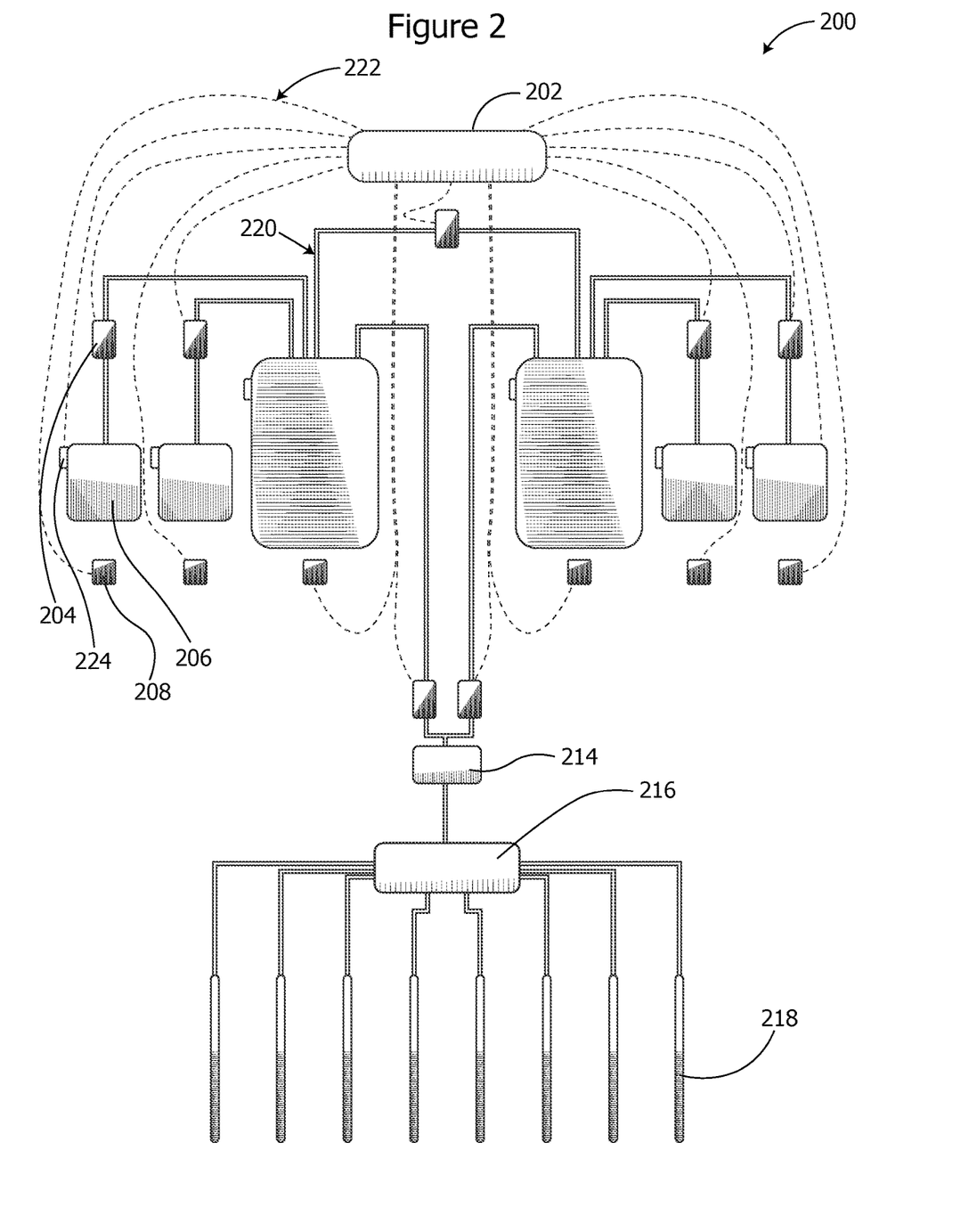
FIG. 2 is a component diagram of an injection remediation system, in accordance with an embodiment.

FIG. 2 is a component diagram of an injection remediation system, in accordance with an embodiment. In one embodiment, a vehicle injection remediation system 200 includes, but is not limited to, a first reservoir 206 configured to contain first material, the first reservoir including a first load sensor 208 and a first dosing pump 204 for sourcing the first material; at least one injection head 218; one or more plumbing lines 220 connecting the first reservoir 206 to the at least one injection head 218; at least one processor 202 configured to control the first dosing pump 204 to maintain or establish a specified flow volume, mass, rate, or ratio associated with the first material based at least partly on weight information obtained from the first load sensor 208. The processor 202 is electrically coupled via one or more conductors 222 to any of the load sensor 208, the level sensor 224, and/or the dosing pump 204. Optionally, the reservoir 206 includes a level sensor 224 configured to output information associated with a volume or level of the first material within the reservoir 206. An injection pump 214 pressurizes the first material for distribution via the manifold 216.

The system 200 can include a different arrangement of any of the components in order to meet the requirements of one or more injection remediation missions. For instance, the processor 202 can comprise a plurality of processors and/or can include electronics, circuitry, integrated circuits, memory, software, or other computer modules configured to implement operations disclosed herein. The reservoir 206 can comprise one or more reservoirs, holding tanks, dispensers, mixers, or other containers, including a plurality of raw material tanks and/or mixing tanks configured to store and/or mix one or more injection materials. Any of the one or more reservoirs 206 can include a load sensor 208 and/or a level sensor 224. Thus, in an instance where two reservoirs 206 are provided, each of the two reservoirs 206 can include an independent load sensor 208 and/or an independent level sensor 224. A dosing pump 204 can also be provided for each of the one or more reservoirs 206 to enable independent dosing and/or metering of injection material from the respective one or more reservoirs 206. The dosing pump 204 can be configured to support flow of injection material from one or more reservoirs 206 to the injection pump 214 or, alternatively, can be configured to support flow of injection material from one or more reservoirs 206 into one or more other reservoirs 206, such as to mix injection materials together. While one injection pump 214 has been depicted, it is within the scope of the present disclosure to include two or more injection pumps 214. Likewise, a plurality of manifolds 216 can be provided to distribute injection material in isolation to one or more injection heads 218. Therefore, in certain embodiments, the plumbing lines 220 are configured to combine one or injection materials prior to the injection pump 214 for distribution via the manifold 216. And, in other embodiments, the plumbing lines 220 are configured to isolate at least some injection material in via one or more other injection pumps 214 and/or manifolds 216 to maintain separation of the at least some injection material. The one or more injection heads 218 can include one injection head 218 or a plurality of injection heads 218. The one or more injection heads 218 can be configured identically and/or have one or more variations, such as with size, dimension, or orifices differences. The one or more injection heads 218 can be configured to output the same injection material or output different injection material among the one or more injection heads 218. Furthermore, in some embodiments, flow rate sensors are disposed at any position in the plumbing lines 220 to directly measure flow rate throughput. For instance, one flow rate sensor can be positioned in plumbing in-line with a first reservoir 206 and a second flow rate sensor can be positioned in-line with an injection pump 214. In such embodiments, the one or more processors 202 can obtain flow rate signals associated with the flow rate sensor for determining and/or monitoring flow rate of an injection material at one or more locations in the plumbing lines 220. The plumbing lines 220 can consist of aluminum, braided steel, copper, polyurethane, or other metal, plastic, synthetic, composite, or rubber material. The conductors 222 can consist of power, ground, analog, and/or data wires composed of copper, tin, gold, composite, or other conducting material, including single and multi-conductor cables. Additionally, in certain embodiments, a user interface is provided that is configured to enable interaction with the one or more processors 202 or any other component of the system 200. The user interface can include a local user interface that is hardwired to the system 200, such as a touch screen display and/or keypad, or can include a wireless user interface, such as an smartphone, tablet, and/or remote computer system. The system 200 can include a network, beacon, or wireless interface, such as BLUETOOTH or WIFI.

In one embodiment, the at least one processor 202 is configured to determine a volume of the material sourced from the at least one reservoir 206 based at least partly on weight information obtained from the at least one load sensor 208. The at least one processor 202 determines a first weight of the reservoir 206 with the material contained therein. The at least one processor 202 then determines a second weight of the reservoir 206 with the material contained therein, such as following use of at least some of the material during an injection remediation operation. The at least one processor 202 then determines a mass delta for the material between the first weight and the second weight. The mass delta or change provides the mass of the material consumed in a time between the determination of the first weight and the determination of the second weight of the reservoir 206. The at least one processor 202 converts the mass delta to volume using a density of the material in the reservoir 206.

In another embodiment, at least one processor 202 is configured to determine a volume ratio involving the material sourced from the at least one reservoir 206 based at least partly on weight information obtained from the at least one load sensor 208. The at least one processor 202 determines a mass delta over a time period for the reservoir 206 using the load sensor 208. The at least one processor 202 converts the mass delta to a mass of the material and/or a volume of the material using density information associated with the material. The volume information for the material is then provided as a ratio with a volume of at least one other material used over substantially the same time. The volume of the other material can be similarly determined by the at least one processor 202 using a mass delta and density provided as user input and/or determined using a level sensor, such as level sensor 224.

In embodiments involving volumetric determinations by the at least one processor 202, the volume of a material can be determined using the a load sensor 208 as discussed, but also using one or more level sensors 224. For instance, the level sensor 224 can be disposed on or in the reservoir 206 and configured to use capacitance, resistance, a laser, acoustics, or another method to determine a level of the material within the reservoir 206. The output of the level sensor 224 can include a digital output or an analog output that is calibrated and convertible by the processor 202 to a value that is associated with a volume of material within the reservoir 206. Thus, the processor 222 can determine volumetric changes and volume amounts over time for a material sourced form a reservoir 206. The level sensor 224 can be used in conjunction with the load sensor 208 to increase precision and/or provide redundancy in volumetric determinations associated with material consumed from the reservoir 206.

In a further embodiment, the at least one processor 202 is configured to determine a mass ratio involving the material sourced from the at least one reservoir 206 based at least partly on weight information obtained from the at least one load sensor 208. The at least one processor 202 identifies a first mass associated with the reservoir 206 at a first time and a second mass associated with the reservoir 206 at a second time. The at least one processor 202 uses the mass change during a time period between the first time and the second time to determine a mass of the material consumed from the reservoir 206 during the time period. The at least one processor 202 determines a mass ratio with at least one other material by providing the mass of the material consumed during the time period as a ratio to a mass of another material consumed during substantially the same time period. The mass of the other material can be determined by the at least one processor 202, such as by similarly using a first and second mass of a different reservoir 206 using another load sensor 208.

In one embodiment, a level sensor 224 is incorporated with the at least one reservoir 206, wherein the at least one processor 202 is configured to determine density information of the material based at least partly on weight information obtained using the load sensor 208 and volume information obtained using the level sensor 224, and control the at least one dosing pump 204 based at least partly on the density information of the material. An injection remediation recipe may specify an injection material by volume, which volume can be used to set the dosing pump 204 speed or rate. Alternatively, in some embodiments, an injection remediation recipe may specify an injection material by weight or mass. In this case, the processor 202 sets the dosing pump 204 speed or rate based on a weight or mass of the injection material. The processor 202 obtains density information for the injection material using a mass of the material in the reservoir 206 determined using the load sensor 208. In the case of dynamic determinations of density, the processor 202 can obtain volume information associated with the injection material, such as by using the level sensor 224 or by an indication that the injection material is associated with a particular level line correlated to a known volume (e.g., fill line is associated with 125 cubic feet). The processor 202 determines density of the injection material using the mass of the injection material and the volume of the injection material within the reservoir 206, or using a predetermined or specified density. With the density of the injection material determined, the processor 202 converts the desired mass of the injection material to a volume of the injection material and sets a rate or speed of the dosing pump 204 to deliver the determined volume of the injection material that satisfies the specified mass requirement.

In one embodiment, the injection remediation system 200 includes, but is not limited to, a level line incorporated within the at least one reservoir 206, wherein the at least one processor 202 is configured to determine density information of the material based at least partly on the weight information obtained using the load sensor 208 and volume information associated with the level line, and control the at least one dosing pump 204 based at least partly on the density information of the material. The processor 202 receives or obtains a mass ratio involving a first injection material of the reservoir 206 and a second injection material or mixture. The mass ratio specifies a certain mass of the first injection material as a percentage of a mass relative to another mass associated with the second injection material. The processor 202 then sets the dosing pump 204 to deliver a volume of the first injection material that meets the mass ratio as specified. The speed or rate of the dosing pump 204 is associated with a volume of the first injection material, so the processor 202 determines the volume of the first injection material using a density of the first injection material. The density of the first injection material can be provided by way of user input or based on a specified or stored density value associated with the first injection material. Alternatively, the processor 202 determines the density of the first injection material using a level line sensor or an indicia marking on the reservoir 206. As the reservoir 206 is filled with the first injection material, the processor 202 detects when the level line sensor is met by the first injection material to initiate a density determination automatically for the first injection material. The processor 202 stores the density information for the first injection material in memory. Thereafter, the processor 202 receives the recipe including a mass ratio involving the first injection material and determines a volume for the first injection material that satisfies the mass ratio using the stored density information for the first injection material. The processor 202 operates a speed or rate of the dosing pump 204 to deliver a volume of the first injection material that satisfies the mass ratio, optionally including operating another dosing pump 204 to deliver a volume of another injection material involved in the mass ratio.

In one embodiment, the injection remediation system 200 includes, but is not limited to, a flow sensor configured to output flow rate information associated with the material, wherein the at least one processor 202 is configured to determine density information of the material based at least partly on the weight information and the flow rate information, and control the at least one dosing pump 204 based at least partly on the density information of the material. A flow rate sensor is positioned in-line with the plumbing of the reservoir 206 to output one or more signals or data that provides flow volume per time. The processor 202 obtains the flow volume over the course of a period of time and determines a volume of injection material consumed over the period of time. In combination, the processor 202 samples a first weight associated with a start of the period of time and a second weight associated with an end of the period of time. The processor 202 uses the first weight and the second weight to determine a consumed mass for the period of time. Using the mass and the volume of injection material consumed over the period of time, the processor 202 determines a density of the injection material, which is usable to populate a profile of the injection material for future operations. For instance, the same injection material may be used in another reservoir 206 without a level sensor 224 or without a flow sensor and the profile information for the injection material can be sourced by the processor 202 to make volumetric determinations and/or speed or rate control settings for an associated dosing pump 204.

In one particular embodiment, the processor 202 is configured to control the at least one dosing pump 204 based at least partly on the amount of the material sourced from the at least one reservoir 206. The processor 202 obtains mass information for the reservoir 206 using the load sensor 208. Using the mass information and/or any density information, the processor 202 determines the amount of injection material consumed over a period of time, which can be expressed in mass, weight, volume, rate, or other amount. The processor 202 uses the amount of injection material consumed over time to feedback control regarding a rate or speed of the dosing pump 204. For instance, if a desired amount of injection material is 5 gallons over a particular time period, but the processor 202 detects using the load sensor 208 that only 4.5 gallons were consumed, the processor 202 can increase a speed of the dosing pump 204 such as by approximately 10% to approach the desired amount of consumption of the injection material. Repeated refinements and continuous feedback are possible to maintain a tight tolerance of injection material amounts during a course of injection remediation.

In one particular embodiment, the processor 202 is configured to control the at least one dosing pump 204 based at least partly on a specified mass ratio and a weight of the material sourced from the at least one reservoir 206. The processor 202 can receive a recipe specifying a percentage by mass of an injection material sourced from the reservoir 206. The processor 202 can set the dosing pump 204 to begin at a speed or rate that is initially determined to yield the desired mass ratio. For instance, the processor 202 can determine the volume of injection material that is associated with the mass ratio using density information as has been disclosed herein. Additionally, the processor 202 monitors the mass changes of the reservoir 206 over time, and/or any mass changes of any other reservoir 206 over time, to continuously and/or regularly determine an actually mass ratio involving the injection material delivered using the dosing pump 204. The actual sampled mass ratio vs. the specified mass ratio is used by the processor 202 to determine a variance. The processor 202 then adjusts a rate or speed of the dosing pump 204 to increase or decrease a volumetric amount associated with a desired mass change, to reconcile a variance between a sampled mass ratio and a specified mass ratio involving the injection material in the reservoir 206. The processor 202 can make similar adjustments to another dosing pump 204 of a different reservoir 206 to reconcile a sample mass ratio and a specified mass ratio involving the injection material. The processor 202 repeats the operations to maintain the actual mass ratio in tight tolerance with the specified mass ratio, by adjusting the dosing pump 204 and/or another dosing pump 204 as needed based upon actual mass determinations over time.

In yet another embodiment, the processor is further configured to control the at least one dosing pump based at least partly on a specified volume ratio and a weight of the material sourced from the at least one reservoir, at least partly using density information that is dynamically determined at least partly using one or more level sensors. The system 200 optionally includes one or more level sensors incorporated on or within one or more reservoirs 206. The level sensors are calibrated to the reservoir 206 to output data or one or more signals that are usable to identify a level of material within the reservoir 206. The processor 202 uses the data or one or more signals and/or the level of material within the reservoir to identify a volume of the material within the reservoir. For instance, a level sensor as a capacitance type float sensor can be incorporated in the reservoir 206 such that filling or depletion of the injection material raises or lowers the capacitance. The processor 202 measures the capacitance to determine the float position within the reservoir and converts this float position to a volume based on a known size of the reservoir 206. The processor 202 uses the volume and weight of the reservoir, accounting for any weight attributed to the reservoir 206 itself, to dynamically determine a density of the injection material contained within the reservoir 206. The dynamic determination of the density of the injection material enables ongoing updates to density that can be attributed to chemical reaction changes or evaporation. For instance, the processor 202 can adjust a speed or rate of the dosing pump 204 dynamically to account for a density drift.

In another embodiment, the processor is configured to control the at least one dosing pump 204 based at least partly on a specified volume ratio and a weight of the material sourced from the at least one reservoir, at least partly using density information that is dynamically determined at least partly using one or more level lines. The reservoir 206 includes one or more markings or indicia on an interior of the reservoir 206 that enables an operator to identify a current volume of the injection material within the reservoir 206. Alternatively, a transparent or semi-transparent window is provided with indicia or markings that enables an operator to visualize a level and/or volume of the injection material within the reservoir 206. For instance, the markings or indicia can include a percentage, fraction, or actual volume for various incremental levels, such as ½ or ¾ or 50 gal. or 150 gal. markings. The manual indicia or marking information can be inputted via a user interface for use by the processor 202 to determine density information in conjunction with any weight information provided by the load sensor 208. In one particular embodiment, the processor 202 includes stored access to a full volume value of the reservoir 206 and the density information can be determined upon initialization merely by confirmation or a determination that the injection material has filled the reservoir 206.

In certain embodiments, the processor 202 is configured to control the at least one dosing pump 204 based at least partly on a specified volume ratio and a weight of the material sourced from the at least one reservoir 206, at least partly using density information that is dynamically determined at least partly using one or more flow rate sensors. One or more flow rate sensors outputs data or one or more signals for use by the processor 202 to determine a volume amount over time. The processor 202 obtains the volume amount for a given time and a mass change amount for the given time using the load sensor 208. The density of the material can then be determined by the processor 202 with dynamic updates over time based on regular or intermittent updates of flow rate and mass changes.

In certain embodiments, the processor 202 is further configured to control a speed of the at least one dosing pump 204 based at least partly the weight information obtained from the at least one load sensor 208. The variable speed dosing pump 204 sources injection material at a given volume over time for combining with another injection material or mixture, delivering to an injection pump 214, distributing by a manifold 216, and/or outputting by an injection head 218. The processor 202 can make fine or course adjustments to the dosing pump 204 to precisely control a volume of injection material sourced from the reservoir 206. While flow sensor input is possible to determine a desired speed or rate setting for the dosing pump 204, the large quantities of injection material and the problems associated with error and/or corrosion of flow sensors make use of flow rate information potentially problematic. Accordingly, the processor 202 uses weight or mass information obtained from the at least one load sensor 208 and extracts mass consumption over time, such as over intervals or irregular times. The mass information obtained by the processor 202 is precise and not prone to error due in part to the load sensor 208 being isolated from the injection material. The processor 202 can use the mass changes of the injection material to determine precision amounts of injection material consumed, injected, or mixed. Furthermore, the processor 202 can use the mass changes to adjust a rate or speed of the dosing pump 204 or another dosing pump 204 associated with a different reservoir 206 to meet desired objectives for mass-based delivery of injection materials in injection remediation sites.

In one particular embodiment, the processor 202 is further configured to control a volume output from the at least one dosing pump 204 based at least partly the weight information obtained from the at least one load sensor 208. While the processor 202 can adjust a rate or speed of the dosing pump 204 based on mass or weight information of an injection material, the processor 202 can optionally adjusted a valve opening or channel diameter of one or more plumbing lines 220 to similarly change a volume of injection material consumed based on mass information. In certain embodiments, one or more solenoid valves are provided with linear control to open a valve partially or fully for passing injection material. The dosing pump 204 can maintain a constant or variable pump rate, while the processor 202 controls a degree to which the one or more solenoid valves are open. The determination as to degree can be accomplished by the processor based on mass information obtained from the load sensor 208. For example, the mass of injection material can be compared at regular intervals of every five minutes by the processor 202. Using density information for the injection material, the processor 202 can determine that the volume of injection material is drifting upward over time by approximately 1%. Thereafter, the processor 202 corrects the increase in volume by decreasing an aperture using a solenoid downstream of the dosing pump 204 by approximately 1%. The overall volume of the injection material is maintained by the processor 202 without necessarily effecting a change in speed of the dosing pump.

In a further embodiment, the processor 202 is configured to determine a variance from a specified mass ratio involving the material based at least partly on the amount of material sourced from the at least one reservoir 206, and adjust an output of the at least one dosing pump 204 to reconcile the variance from the specified mass ratio. The processor 202 can initially calibrate the dosing of injection material from the at least one reservoir 206 by initializing the at least one dosing pump 204 to a first pump rate or speed. The first pump rate or speed can be random, based on density of the injection material, or be based on an estimated value to yield the specified mass ratio. Thereafter, the processor 202 determines the actual mass sourced from the reservoir 206 at the first pump rate or speed using the load sensor 208. The actual mass sourced from the reservoir 206 is used by the processor 202 to determine the actual mass ratio involving the injection material sourced from the reservoir 206 at the specified speed or rate of the at least one dosing pump 204. With the actual mass ratio determined, the processor 202 can identify a precision variance between the actual mass ratio and the specified mass ratio and control the speed or rate of the at least one dosing pump 204 to reconcile the difference. This initialization operation can be performed, for example, prior to any injection remediation with a feedback line returning a mixture of the injection material to another reservoir 206. Alternatively, the initialization operation can be performed during injection remediation during a first phase of remediation. Furthermore, the processor 202 can continuously or intermittently adjust a speed or rate of dosing of the injection material based on a mass of the injection material consumed to maintain the specified ratio involving the injection material with tight tolerance.

In some embodiments, the processor 202 is configured to determine a variance from a specified volumetric ratio involving the material based at least partly on the amount of material sourced from the at least one reservoir 206, and adjust an output of the at least one dosing pump 204 to reconcile the variance from the specified volumetric ratio. The processor 202 can obtain a first mass of a first injection material at a first time using a first load sensor 208 associated with a first reservoir 206. Similarly, the processor 202 can obtain a first mass of a second injection material at the first time using a second load sensor 208 associated with a second reservoir 206. At a second time subsequent to the first time, such as during a course of injection remediation consuming the first injection material and the second injection material, the processor 202 can obtain a second mass of the first injection material and a second mass of the second injection material using the first load sensor 208 and the second load sensor 208, respectively. Using the mass information and density information associated with the first injection material and the second injection material, the processor 202 can determine a volumetric ratio between the first injection material and the second injection material between the first time and the second time. The volumetric ratio determined can be used by the processor 202 to identify and determine a degree of variance with a desired volumetric ratio for the first injection material and the second injection material. Based on the degree of variance, the processor 202 can control either or both of a first dosing pump 204 of the first material or a second dosing pump 204 of the second material, in order to increase or decrease the contribution of the first material or the second material to reconcile the variance with the desired volumetric ratio. For instance, the processor 202 can increase a rate of the first dosing pump 204 by 5% and decrease the second dosing pump 204 by 5%. In addition, the processor 202 can optionally introduce other injection material, such as water, to dilute either the first material, the second material, or the mixture of the first material and second material.

In one embodiment, the processor 202 is configured to determine a variance between a first flow rate of the material determined using a flow sensor and a second flow rate of the material determined using weight information obtained from the at least one load sensor, and output an alert of the variance between the first flow rate and the second flow rate. In some injection remediation systems, a flow rate sensor is positioned in-line with a plumbing line 220 to measure the flow of injection material sourced from a reservoir 206. Due to corrosion or high solid particle content of the injection material, the flow rate sensor may become damaged over time without notice. The flow rate sensor can therefore provide incorrect data or signals regarding volume of the injection material, which can negatively affect pressure, mixture ratios, and/or introduce inconsistency in the injection remediation process. Accordingly, the processor 202 determines an independent sample of flow rate using changes in mass of a reservoir 206 over time. With the mass delta and density information for the injection material sourced from the reservoir 206, a volume of the injection material is determined and converted to rate using a time parameter. The processor 202 determines a variance between a mass-based flow rate determination and a direct flow sensor-based flow rate determination and makes an automatic recalibration of the flow rate sensor. The recalibration reconciles the variance with the mass-based flow rate resulting in a substantially identical flow sensor-based flow rate. The processor 202 can perform regular, intermittent, or continuous updates to the calibration of the flow sensor to ensure that the flow rate indications are accurate. However, in a case where the variance exceeds a threshold, recalibrations are ineffective, or the flow sensor becomes otherwise inoperable, the processor 202 can output an alert, deactivate the flow sensor, bypass the flow sensor, and/or bring online a backup flow sensor.

In certain additional embodiments, the injection remediation system 200 can include one or more pressure gauges. Pressure in the system 200, such as within plumbing lines 220 can be monitored by the processor 202 to determine whether the pressure deviates from a specified amount for a particular remediation mission. The processor 202 can make adjustments to the dosing pump 204 to reduce or increase a rate of contribution of one or more injection materials to the plumbing lines 220. In further embodiments, the processor 202 stores, transmits, or produces one or more records during or subsequent to any injection remediation mission, providing one or more details of the following: time, mass-ratio, volume-ratio, mass-based flow rate, flow sensor-based flow rate, injection material mass, injection material volume, injection material level, pressure, injection material identification, injection material mixture, mixing process, mixing duration, batch storage time, injection duration, and/or site information. The documentation can be automatically generated for print, email, network or web retrieval, smartphone or tablet access, or archival.

Figure 3:
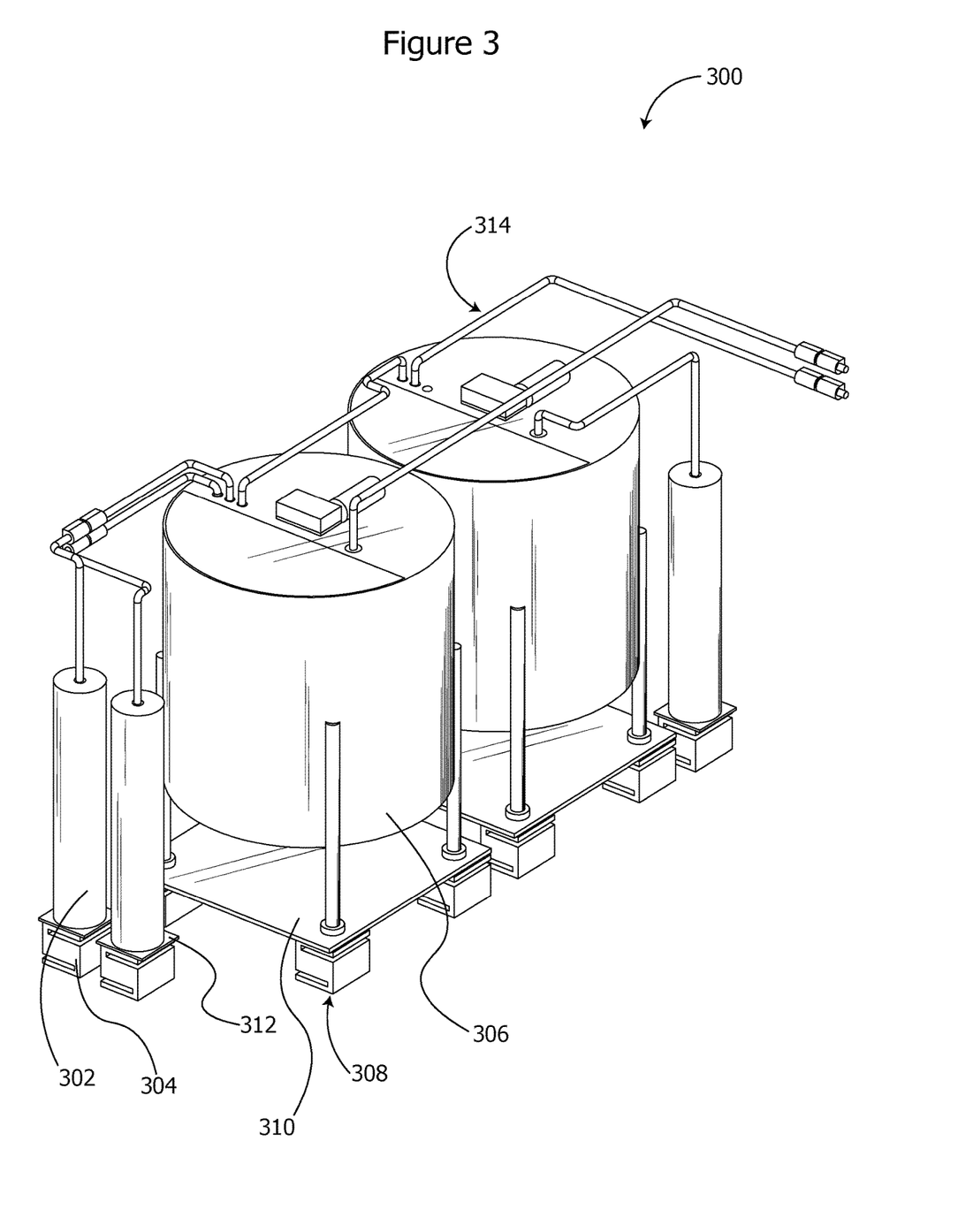
FIG. 3 is a perspective view of an injection remediation system, in accordance with an embodiment.

FIG. 3 is a perspective view of an injection remediation system, in accordance with an embodiment. In one embodiment, the remediation system 300 includes, but is not limited to a raw material tank 302, a load cell 304, a base 312, a mixing tank 306, a load cell set 308, a platform 310, and/or plumbing 314 that operate to provide injection remediation. The raw material tank 302 is configured to store a first injection material and the mixing tank 306 is configured to mix or store the first injection material and/or one or more other injection materials. The load cell 304 and/or the load cell set 308 are configured to provide data or signal output that is usable by a control system or processor to determine weight or mass of the first injection material and/or one or more other injection materials.

In one embodiment, a single load cell 304 supports a raw material tank 302 via a base 312. The load cell 304 is electronically and/or wirelessly coupled to a control unit to output data or signals usable to determine weight or mass of injection material disposed within the raw material tank 302. The load cell 304 can be independent of the raw material tank 302 or incorporated into the raw material tank 302. The base 312 can be a section of a floor surface or platform to substantially conceal or protect the load cell 304. Alternatively, the base 312 and/or the load cell 304 can be positioned on a surface or platform. Thus, the base 312 and/or load cell 304 can be used to retrofit an existing injection remediation system, such as by lifting an existing raw material tank 302 and positioning the base 312 and/or load cell 304 below thereof.

In certain embodiment, a plurality of raw material tanks 302 may be included in the system 300 with any raw material tank 302 providing injection material to any other raw material tank 302, mixing tank 306, plumbing 314, and/or reservoir. The raw material tank 302 can be configured to store and/or dispense one or more injection materials, ingredients, or mixtures, including any liquid and/or solid. Additionally, the raw material tank 302 is illustrated with one load cell 304, but the raw material tank 302 may be supported by a plurality of load cells 304. Additionally, the base 312 may be omitted and/or incorporated into either the load cell 304 or the raw material tank 302.

In another embodiment, a mixing tank 306 is disposed on a platform 310 that is supported by a load cell set 308. The load cell set 308 is electronically and/or wirelessly coupled to a control unit to output data or signals usable together to determine weight or mass of injection material disposed within the mixing tank 306. The load cell set 308 can be incorporated into the mixing tank 306. Alternatively, the mixing tank 306 can be incorporated into a mass-based injection remediation system by being moved or disposed onto the platform 310 and/or the load cell set 308. The platform 310 can be a section of a floor surface, deck, or other member to substantially conceal or protect the load cell set 308. Alternatively, the platform 310 and/or the load cell set 308 can be positioned on a surface, deck, or other member. Thus, the platform 310 and/or load cell set 308 can be used to retrofit an existing injection remediation system, such as by lifting an existing mixing tank 306 and positioning the platform 310 and/or load cell set 308 below thereof.

In certain embodiment, a plurality of mixing tanks 306 may be included in the system 300 with any mixing tank 306 providing injection material to any other raw material tank 302, mixing tank 306, plumbing 314, and/or reservoir. The mixing tank 306 can be configured to mix, store, and/or dispense one or more injection materials, ingredients, or mixtures, including any liquid and/or solid. Additionally, the mixing tank 306 is illustrated with a load cell set 308 that consists of a four load cells. However, the load cell set 308 can comprise two, three, five, or more load cells that are arranged or positioned differently, such as centrally, along a perimeter edge or in one of more of the following patterns: grid, cross, radial, concentric, or irregular. Additionally, the platform 310 may be omitted and/or incorporated into either the load cell set 308 or the mixing tank 306. The platform 310 can support two or more reservoirs, raw material tanks 302, and/or mixing tanks 306, such as when two or more of the foregoing contain a similar or identical injection material. Also, any of the mixing tank 306, the raw material tank 302, or other reservoir can be constructed to include one or more load cells as a support or integral component thereto. In one particular embodiment, the load cell 304 and/or load cell set 308 can be configured to suspend a raw material tank 302, mixing tank 306, or another reservoir therefrom.

Figure 4:
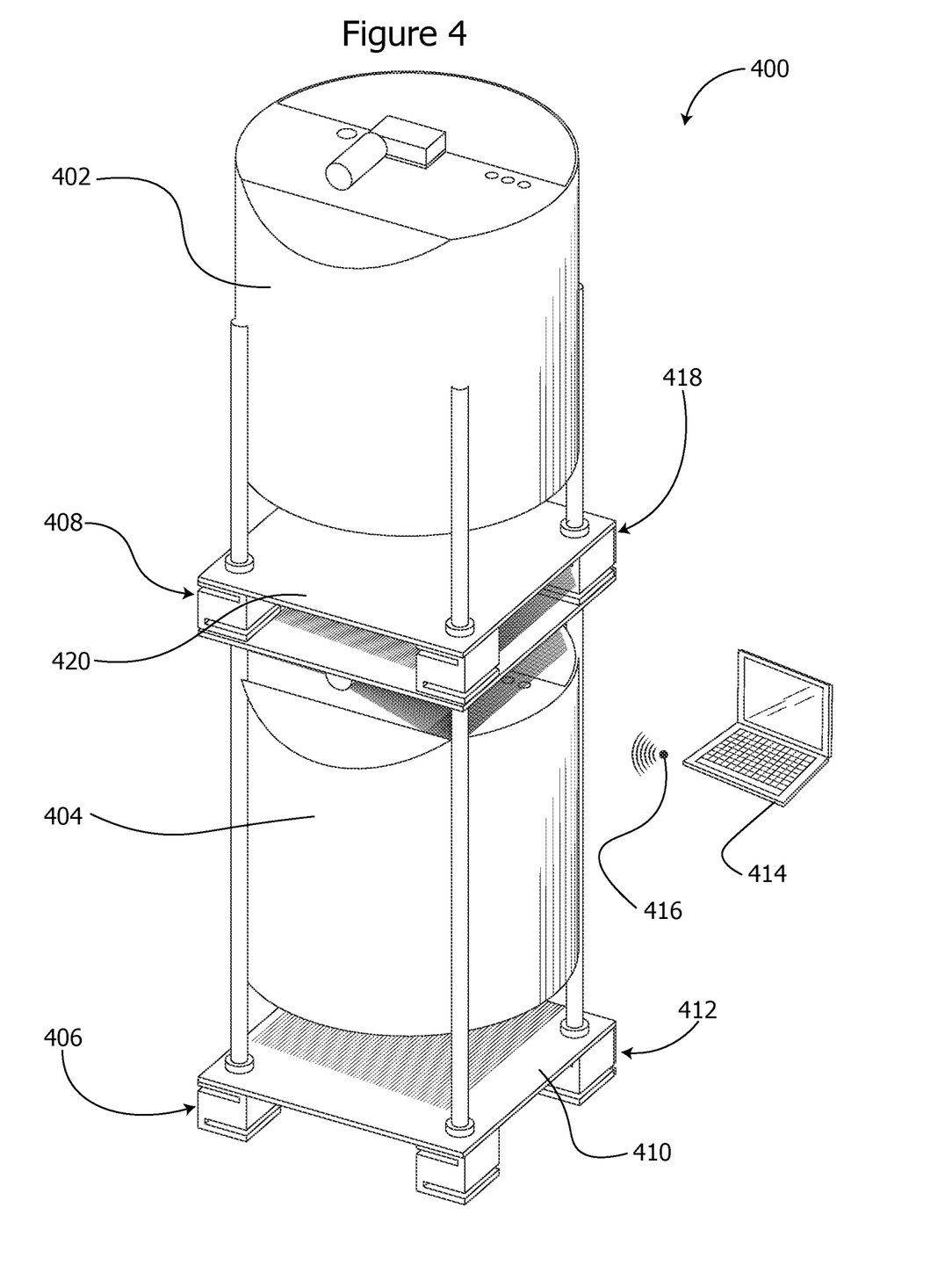
FIG. 4 is a perspective view of a stackable arrangement 400 for an injection remediation system, in accordance with an embodiment.

FIG. 4 is a perspective view of a stackable arrangement 400 for an injection remediation system, in accordance with an embodiment. In one embodiment, the arrangement 400 includes, but is not limited to, a mass platform 406 including a frame 410 configured to support a reservoir 404 of an injection remediation system; a plurality of load sensors 412 positioned on the frame 410 and configured to measure weight applied to the frame 410; and at least one computer 414 configured to determine an amount of the material sourced from the reservoir 404 based at least partly on weight information obtained from the at least one load sensor 412; and at least one interface 416 configured to communicate information associated with the amount of the material for controlling one or more dosing pumps. One or more additional platforms 408 are provided that include a frame 420 configured to support a reservoir 402 of an injection remediation system; a plurality of load sensors 418 positioned on the frame 420 and configured to measure weight applied to the frame 420, wherein the at least one computer 414 is further configured to determine an amount of the material sourced from the reservoir 402 based at least partly on weight information obtained from the at least one load sensor 418 and wherein the at least one interface 416 is configured to communicate information associated with the amount of the material for controlling one or more dosing pumps.

Accordingly, in certain embodiments, the stackable arrangement 400 enables a plurality of reservoirs to be stacked vertically using a plurality of mass platforms. A first mass platform 406 is positioned on a bottom of the stackable arrangement 400 that supports the reservoir 404, another mass platform 408, and the reservoir 402. The reservoir 404 is configured to store, mix, contain, and/or dispense an injection material. Likewise, the reservoir 402 is configured to store, contain, and/or dispense the same or a different injection material. The plurality of load sensors 412 are configured to output data or one or more signals usable by the computer 414 to determine a mass or weight of the injection material of the reservoir 404 at one or more points of time. To determine the mass or weight of the injection material of the reservoir 404, the computer 414 obtains a tare or empty weight of the stackable arrangement 400 supported by the platform 406 and a weight or mass output of the load sensors 418 attributable to injection material of the reservoir 402. The computer 414 removes the tare or empty weight of the stackable arrangement 400 and the weight or mass output of the load sensors 418 attributable to injection material of the reservoir 402 from the mass or weight output of the load sensors 412. The second mass platform 408 is positioned in the stackable arrangement 400 on top of the reservoir 404 to support the reservoir 402. The reservoir 402 is configured to store, contain, and/or dispense the same or a different injection material as compared to the reservoir 404. The plurality of load sensors 418 are configured to output data or one or more signals usable by the computer 414 to determine a mass or weight of the injection material of the reservoir 402 at one or more points of time. To determine the mass or weight of the injection material of the reservoir 402, the computer 414 obtains a tare or empty weight of the stackable arrangement 400 supported by the platform 408 and a weight or mass output of the load sensors 418. The computer 414 removes the tare or empty weight of the stackable arrangement 400 above the platform 408 to yield the mass or weight of the injection material of the reservoir 402. In certain embodiments, because the injection material of reservoir 404 and/or injection material of reservoir 402 is consumed at a varying rate, speed, mass, or volume, the computer 414 continuously, intermittently, regularly, or otherwise feeds back the mass or weight attributed to the injection material of the reservoir 402 into determinations of the mass or weight attributed to the injection material of the reservoir 404. Stated differently, the computer 414 determines individual weights or masses of each of the injection material of reservoir 404 and/or reservoir 402, factoring in the variable consumption rate of the injection materials of reservoir 404 and/or reservoir 402, and the fact that the load sensors 412 include the weight of each of the reservoirs 402 and 404 as well as their variable contents.

The particular embodiment of the stackable arrangement 400 enables reduction in floor or surface space with extensibility vertically. The number of reservoirs that may be stacked is potentially unlimited with mass platforms disposed therebetween, including potentially three to ten or more stacked reservoirs. The computer 414 can accept additional platforms and reservoirs in a modular manner with each additional segment and variable injection material being factored into mass and/or weight determinations for injection material of lower segments. The number of load sensors at each platform, or the arrangement thereof, are reconfigurable based on a particular reservoir or other constraints. For instance, platform 406 can include more load sensors 412 than platform 408 due in part to the platform 406 supporting additional structural weight. Each of the load sensors 412 may have an output or mass/weight range that can become saturated with higher loads. Thus, by increasing a number of load sensors 412, the computer 414 can obtain more resolution at higher load levels with each load sensor 412 contributing a smaller mass component for the platform 406. The number of load sensors can decrease progressively for each platform of a vertical stack. Also, while the platform 406 is illustrated as a square support member, a variety of sizes, shapes, thicknesses, and/or dimensions are possible, with various platforms of a stack being different. It is further possible to combine a plurality of stacked arrangements 400 to form a three-dimensional grid, with the computer 414 independently determining a mass or weight attributed to material of each reservoir at each level of each stack in the grid.

Figure 5:
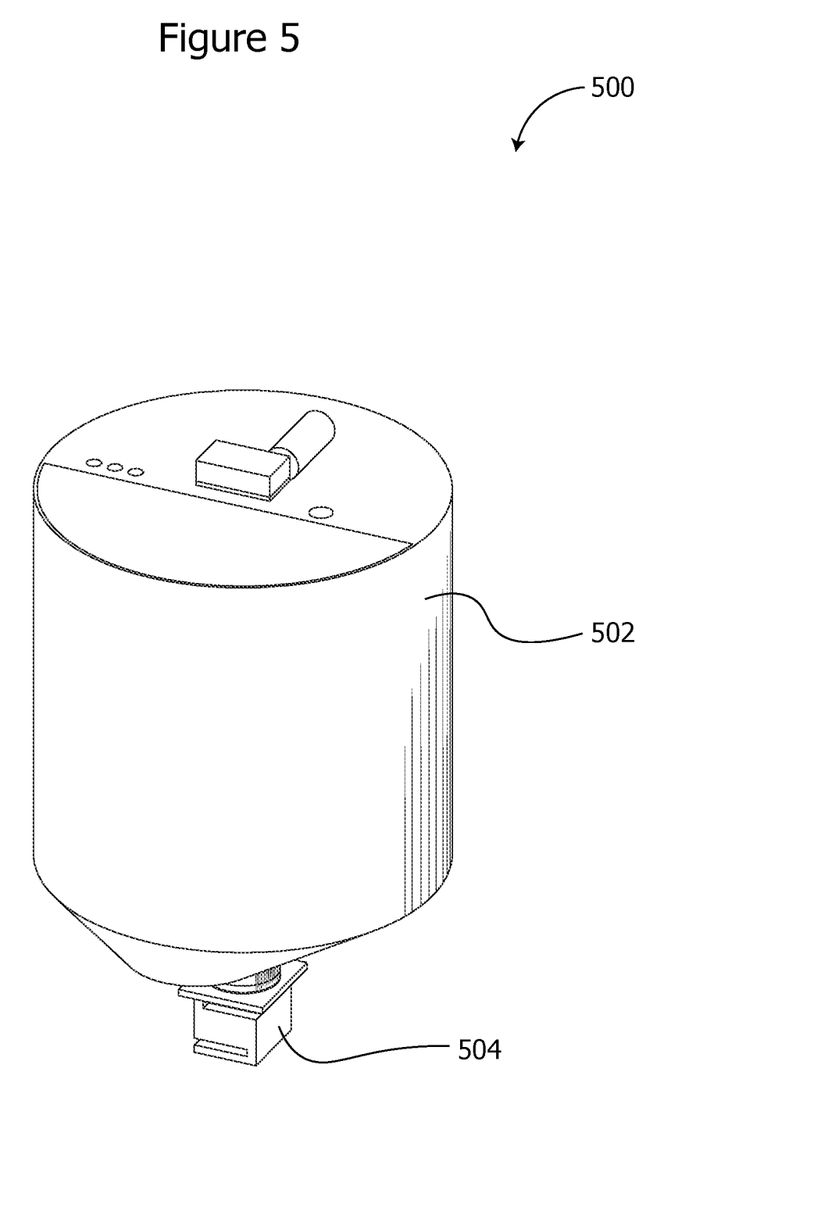
FIG. 5 is a perspective view of a load cell reservoir for an injection remediation system, in accordance with an embodiment.

FIG. 5 is a perspective view of a load cell reservoir for an injection remediation system, in accordance with an embodiment. In one embodiment, a load cell reservoir 500 includes, but is not limited to, a load sensor base 504 configured to support a reservoir 502 of an injection remediation system and configured to obtain a weight or mass of material stored, contained, or dispensed from the reservoir 502. The reservoir 502 optionally includes a level sensor integrated with or incorporated on the reservoir 502 that is configured to determine or indicate a volume level of injection material of the reservoir 502.

In various embodiments, the load cell reservoir 500 is installable in an existing injection remediation system to enable mass-based operations as disclosed herein. One load cell reservoir 500 can be used in conjunction with another non-load cell reservoir. Alternatively, a plurality of the load cell reservoir 500 can be modularly combined as part of a complete injection remediation system. The load sensor base 504 can be positioned directly on a floor, platform, or other surface. Alternatively, a modular deck is provided with one or more female mating receptacles to receive the load sensor base 504 and secure the reservoir from lateral movement or tipping.

In certain embodiments, the load cell reservoir 500 can assume a different configuration, size, shape, or dimension to provide various options for integration into an injection remediation system. Additionally, the load cell reservoir 500 can be configured as a mixing tank, a holding tank, a raw material tank, a manifold, a distribution tank, a bin, or another container type. Mounts, gearboxes, and/or plumbing lines or couplings are further configurable or standardized between different models of load cell reservoirs 500 to support customization in the build of an injection remediation system. Additionally, the reservoir 502 can swivel, extend, and/or retract relative to the cell base 504 to enable orientation and/or positioning adjustments during integration to an injection remediation system.

The present invention may have additional embodiments, may be practiced without one or more of the details described for any particular described embodiment, or may have any detail described for one particular embodiment practiced with any other detail described for another embodiment.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An injection remediation system comprising:
   at least one reservoir configured to contain material;
   at least one load sensor supporting the at least one reservoir;
   at least one level sensor incorporated with the at least one reservoir;
   at least one dosing pump operably coupled to the at least one reservoir and configured to controllably source the material; and
   at least one processor configured to (i) determine density of the material based at least partly on weight obtained from the at least one load sensor and volume obtained using the at least one level sensor and (ii) control the at least one dosing pump based at least partly on the density of the material.

2. The system of claim 1, further comprising:
   one or more plumbing lines connecting the at least one reservoir to at least one injection head.

3. The system of claim 1, further comprising:
   at least one injection pump associated with one or more plumbing lines and configured to pressurize the material.

4. The system of claim 1, further comprising:
   at least one injection head configured to output the material.

5. The system of claim 1, wherein the at least one load sensor comprises:
   a plurality of load sensors supporting the at least one reservoir.

6. The system of claim 1, further comprising:
   at least one additional reservoir configured to contain different material;
   at least one additional load sensor supporting the at least on additional reservoir; and
   at least one additional dosing pump operably coupled to the at least one additional reservoir and configured to controllably source the different material wherein the at least one processor is configured to determine an amount of the material.

7. The system of claim 1, wherein the system is incorporated with a vehicle.

8. The system of claim 1, wherein the at least one processor is configured to determine volume of the material sourced from the at least one reservoir based at least partly on weight obtained from the at least one load sensor.

9. The system of claim 1, wherein the at least one processor is configured to determine a volume ratio involving the material sourced from the at least one reservoir based at least partly on weight obtained from the at least one load sensor.

10. The system of claim 1, wherein the at least one processor is configured to determine a mass ratio involving the material sourced from the at least one reservoir based at least partly on weight obtained from the at least one load sensor.

11. The system of claim 1, wherein the processor is further configured to perform an operation comprising:
    control the at least one dosing pump based at least partly on an amount of the material sourced from the at least one reservoir.

12. The system of claim 1, wherein the processor is further configured to perform an operation comprising:
    control the at least one dosing pump based at least partly on a specified mass ratio.

13. The system of claim 1, wherein the processor is further configured to perform an operation comprising:
    control the at least one dosing pump based at least partly on a specified volume ratio.

14. The system of claim 1, wherein the processor is configured to: control a speed of the at least one dosing pump.

15. The system of claim 1, wherein the processor is configured to control a volume output from the at least one dosing pump.

16. The system of claim 1, wherein the processor is further configured to perform operations comprising:
    determine a variance from a specified mass ratio involving the material, and
    adjust an output of the at least one dosing pump to reconcile the variance from the specified mass ratio.

17. The system of claim 1, wherein the processor is further configured to perform operations comprising:
    determine a variance from a specified volumetric ratio involving the material, and
    adjust an output of the at least one dosing pump to reconcile the variance from the specified volumetric ratio.

18. An injection remediation system comprising:
    a first reservoir configured to contain first material, the first reservoir including a first load sensor and a level sensor;
    a first dosing pump for sourcing the first material;
    a second reservoir configured to contain second material, the second reservoir including a second load sensor;
    a second dosing pump for sourcing the second material;
    at least one processor configured to control the first dosing pump and the second dosing pump to maintain a specified ratio between the first material and the second material.

19. An injection system comprising:
    at least one reservoir configured to contain material;
    at least one load sensor supporting the at least one reservoir;
    at least one level sensor included with the at least one reservoir;
    at least one dosing pump operably coupled to the at least one reservoir and configured to controllably source the material; and
    at least one processor configured to control the at least one dosing pump at least partly using density information that is dynamically determined using the at least one level sensor and the at least one load sensor.

* * * * *

UNITED STATES PATENT AND TRADEMARK OFFICE
CERTIFICATE OF CORRECTION

| | |
|---|---|
| PATENT NO. | : 11,738,379 B2 |
| APPLICATION NO. | : 17/381948 |
| DATED | : August 29, 2023 |
| INVENTOR(S) | : John Gregg |

It is certified that error appears in the above-identified patent and that said Letters Patent is hereby corrected as shown below:

In the Claims

Claim 6, at Column 21, Line 43, "on" should be: "one".

Claim 6, at Column 21, Lines 46-48, should NOT include "wherein the at least one processor is configured to determine an amount of the material.".

Claim 14, at Column 22, Line 16, should NOT include a ";".

Signed and Sealed this
Sixth Day of February, 2024

*Katherine Kelly Vidal*

Katherine Kelly Vidal
*Director of the United States Patent and Trademark Office*